(12) United States Patent
Hamza (10) Patent No.: US 7,455,070 B2
(45) Date of Patent: Nov. 25, 2008

(54) SWIMMING POOL VACUUM RELIEF SAFETY VALVE

(76) Inventor: Hassan H. Hamza, 6358 Raylene Ct., Simi Valley, CA (US) 93063

( * ) Notice: Subject to any disclaimer, the term of this patent is extended or adjusted under 35 U.S.C. 154(b) by 304 days.

(21) Appl. No.: 11/338,563

(22) Filed: Jan. 23, 2006

(65) Prior Publication Data

US 2006/0201556 A1 Sep. 14, 2006

(51) Int. Cl.
F16K 17/04 (2006.01)
F16K 21/14 (2006.01)
E04H 4/12 (2006.01)
E04H 4/00 (2006.01)

(52) U.S. Cl. .................. 137/467; 137/514; 137/526; 251/4; 251/297; 4/504; 4/509

(58) Field of Classification Search .......... 137/467, 137/514, 526; 251/64, 295, 297; 417/306; 4/504, 509
See application file for complete search history.

(56) References Cited

U.S. PATENT DOCUMENTS

| 529,865 | A | * | 11/1894 | Jensen | 417/306 |
|---|---|---|---|---|---|
| 1,093,389 | A | * | 4/1914 | Ford | 417/306 |
| 2,149,777 | A | * | 3/1939 | Kidwell | 417/306 |
| 3,072,143 | A | * | 1/1963 | Fleischhacker | 137/514 |
| 4,743,169 | A | * | 5/1988 | Funakawa et al. | 417/306 |
| 5,682,624 | A | * | 11/1997 | Ciochetti | 4/509 |
| 5,947,700 | A | * | 9/1999 | McKain et al. | 417/306 |
| 5,991,939 | A | * | 11/1999 | Mulvey | 4/509 |
| 6,098,654 | A | * | 8/2000 | Cohen et al. | 137/467 |
| 6,171,073 | B1 | * | 1/2001 | McKain et al. | 417/306 |
| 6,251,285 | B1 | * | 6/2001 | Ciochetti | 137/526 |
| 6,289,918 | B1 | * | 9/2001 | Rief et al. | 137/467 |
| 6,295,661 | B1 | * | 10/2001 | Bromley | 4/504 |
| 6,468,052 | B2 | * | 10/2002 | McKain et al. | 417/306 |
| 6,591,863 | B2 | * | 7/2003 | Ruschell et al. | 137/467 |
| 6,687,923 | B2 | * | 2/2004 | Dick et al. | 4/504 |
| 6,779,205 | B2 | * | 8/2004 | Mulvey et al. | 4/509 |
| 2006/0201555 | A1 | * | 9/2006 | Hamza | 137/526 |
| 2006/0260034 | A1 | * | 11/2006 | Hamza | 4/504 |

* cited by examiner

*Primary Examiner*—John Rivell
(74) *Attorney, Agent, or Firm*—Kelly Lowry & Kelley LLP (57) ABSTRACT

A vacuum relief safety valve includes a housing defining an inner chamber and attached to the suction-side of the swimming pool or spa pump. An air inlet aperture is formed in the housing so as to be open to ambient air. A sealing element is disposed within the housing and biased against the air inlet aperture by a spring so as to effectively seal the inner chamber of the housing from ambient air. When a maximum allowed vacuum level within the pump is exceeded, such as when a swimming pool drain is obstructed, the sealing element moves into the inner chamber and opens the air inlet aperture causing the pump to rapidly lose its prime and enabling removal of the entrapment.

15 Claims, 10 Drawing Sheets

SWIMMING POOL VACUUM RELIEF SAFETY VALVE

BACKGROUND OF THE INVENTION

The present invention generally relates to vacuum relief valves. More particularly, the present invention relates to a vacuum relief safety valve for use in swimming pools, spas and the like which causes the pump to lose its prime if a pre-determined vacuum level is reached in the pump system, such as when an object obstructs the pool's drain.

To maximize enjoyment and maintain proper sanitary conditions, swimming pools must be constantly cleaned of debris, dirt and other contaminants. Pools of various types are known to have one or more suction inlets where pool water is sucked along the line via a pump to filtration, aeration, chemical treatment and other type of equipment prior to being returned to the pool via one or more return outlets.

In more recent pool designs, some of the suction inlets are positioned in the bottom or lower region of the pool. Very recently developed pool systems, known as in-floor cleaning systems, have one or more suction inlets which suck pool water therethrough and any debris of pollutants entrained therein are cleaned from the water by being pumped through a filtration and/or treatment station. As with all pools and spas, a high rate of water flow must be achieved in order to maintain an acceptable level of cleanliness. Consequently, a high capacity pump must be employed to draw the water from the pool, with a relatively larger pump generally being required as the size of the pool increases.

Some of the water inlets of such drains have relatively small opening areas and, when large volumes of water being pumped therethrough, very high suction forces at the inlet can be induced. These forces can be so extreme that if a pool user contacts the inlet by any part of their body, they can be held thereagainst, unable to be dislodged, even by excessive force. Such vacuum forces have become so excessive that there have been cases of disembowelment. When the suction inlet is located at or more adjacent to the bottom of a pool, the user can thus be submerged with the risk of drowning or other grievous injury. When such an incident occurs, the vacuum level in the drain line and pool's pump rises sharply.

Occurrences of this type of accident has caused the pool industry to look for solutions that prevent an individual, such as a child, from becoming entrapped at the drain. Some approaches have been by modifying the drain's construction. Examples of this approach include U.S. Pat. No. 5,809,587 to Fleischer and U.S. Pat. No. 6,295,661 to Bromley. However, these devices are fairly complex and expensive to produce. Moreover, these approaches are only acceptable for new pool construction, and are not capable of being incorporated as a retrofit into existing pools and spas.

Yet other approaches involve the insertion of a safety valve into a section line of the filtration pump system. Examples of these include, U.S. Pat. No. 5,682,624 to Ciochetti; U.S. Pat. No. 6,591,863 to Ruschell et al.; and U.S. Pat. No. 6,687,923 to Dick et al. However, this approach also presents many drawbacks. First, such piping is typically submerged below the ground and often encased in or otherwise positioned below concrete. Thus, access to the pipes is not readily obtained unless the safety valve is incorporated into the system when the swimming pool is built. Otherwise, the valves require that the pipe be cut so that the safety valve device can be inserted therein. Cutting these lines increases the opportunity for air leakage in the suction side. Moreover, such installation typically requires professionals having the appropriate tools and ability to install such safety devices.

Oftentimes, these devices also require calibration by experimentation at the pool site such that the safety valve opens only in an excessive vacuum situation. For example, U.S. Pat. No. 5,682,624 includes a manual turn screw for calibrating the valve assembly at the pool site. However, vacuum levels of a specific pump can change from one day to another due to many factors. Moreover, such manual calibration is dangerous if a child were to turn the knob and adjust the calibration such that the safety device did not work properly. Another problem with the '624 device is that it includes many openings which can be filled with water, dirt, insects and other debris. A problem with all such "in-line" systems is that they are typically not close to the pump. The closer one gets to the pump, the better the safety device responds to emergencies.

Accordingly, there is a continuing need for a pool safety valve which overcomes the deficiencies described above. The safety valve should be capable of being attached directly to the pump. The safety valve should also be simple enough in design so as to be manufactured inexpensively and installed by the pool owner. The safety valve should also be capable of being used in existing pools as a retrofit. The present invention fulfills these needs and provides other related advantages.

SUMMARY OF THE INVENTION

The present invention resides in a vacuum relief safety valve for a swimming pool or spa pump. The safety valve generally comprises a housing defining an inner chamber and attached to the swimming pool or spa pump, or a suction-side pipe of the swimming pool or the spa, so as to be in fluid communication with the pump. Typically, the housing is threadedly connected to the pump. In a particularly preferred embodiment, the housing is threadedly connected to a drainage port of the pump.

The housing is typically comprised of a base plate and a cap which cooperatively define the inner chamber. The base plate includes an outwardly threadedly extension and an aperture extending through the extension and the base plate and into the inner chamber. The air inlet aperture is typically formed in an end wall of the cap generally opposite the base plate. The air inlet aperture is open to the environment and ambient air. An inner wall of the housing includes at least one flute or depression formed therein which permits air to flow therethrough, to the base plate, and into the pump.

A sealing element is disposed within the housing and biased against the air inlet aperture so as to effectively seal the inner chamber from ambient air. A spring disposed within the inner chamber of the housing biases the sealing element against the air inlet aperture. The sealing element may comprise a disk, a ball, or any other configuration which effectively seals the air inlet aperture. In a particularly preferred embodiment, the sealing element includes an 0-ring or gasket around a peripheral edge thereof which provides an orthogonal seal against an upper ledge of the housing adjacent to the air inlet aperture of the housing.

The sealing element is adapted to move into the inner chamber and open the air inlet aperture when a maximum allowed vacuum level within the pump is exceeded, such as when the swimming pool or spa drain is obstructed.

In a particularly preferred embodiment, a seat is formed in the housing against which an end of the spring, generally opposite the sealing element, engages. The seat includes a notch or passageway therein to permit water or air to pass therethrough even when the spring is compressed.

Preferably, the sealing element includes at least one arm extending therefrom having at least a portion thereof biased against the inner wall of the housing. In a particularly preferred embodiment, a spring is disposed within a plurality of arms so as to bias the arms outwardly against the inner wall of the housing. The arm engages a ledge formed on the inner wall of the housing to prevent the closing of the sealing element. When the one or more arms engage the ledge, the sealing element is locked or temporarily locked into an open position, with the pump having lost its prime. The sealing element is then manually or automatically retracted back to its close position.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

As shown in the accompanying drawings for purpose of illustration, the present invention resides in a vacuum relief safety valve for a swimming pool or spa pump which is designed to open and introduce ambient air into the pump such that it loses its prime when a vacuum level is exceeded caused by obstruction of a swimming pool drain. When the terminology "pool" or "spa" is used herein, it includes swimming pools, spas, ponds, lakes, etc., especially when the aforementioned have recreational applications. The term "drain" or "inlet" is used throughout the specification and can include one or more inlets or drains of various types. The present invention is particularly suited for residential pools, spas and hot tubs.

With reference now to FIGS. 1-4, a vacuum relief safety valve 10 embodying the present invention is shown. The safety valve 10 typically includes a base plate 12 and an upper cap 14 which are attached to one another, such as by the illustrated bolts and nuts 16 and 18. In a particularly preferred embodiment, as illustrated, the housing includes a plurality of ribs 20 which serve as frictional points and grips such that a homeowner can grasp the safety valve 10 for threaded connection to the swimming pool pump or related equipment, as will be more fully described herein.

In the preferred embodiment illustrated in FIGS. 1-4, an air inlet aperture 22 is formed through the housing, typically in an end wall 24 of the cap 14. In a particularly preferred embodiment of the present invention, a mesh screen or the like 23 is disposed adjacent to the inlet aperture 22, and adapted to prevent insects, leaves, dirt, etc., from entering the air inlet aperture. At a generally opposite end of the safety valve 10 is an extension 26 which includes exterior threads 28 for insertion into a threaded aperture, such as a drainage port or other threaded port of the pump filtration system, as will be more fully described herein. Extension 26 may be equipped with slip fit for fluing on the suction piping. An aperture 30 extends through the extension 26 and base plate 12 such that fluid flow is possible through the aperture 30 into the interior chamber 32 of the housing and out the air inlet aperture 22 if there is no impedance. Preferably, a seal such as the illustrated O-ring 34 encircles the extension 26 so as to provide a fluid and air tight seal between the safety valve 10 and the pump or piping.

Figure 1:
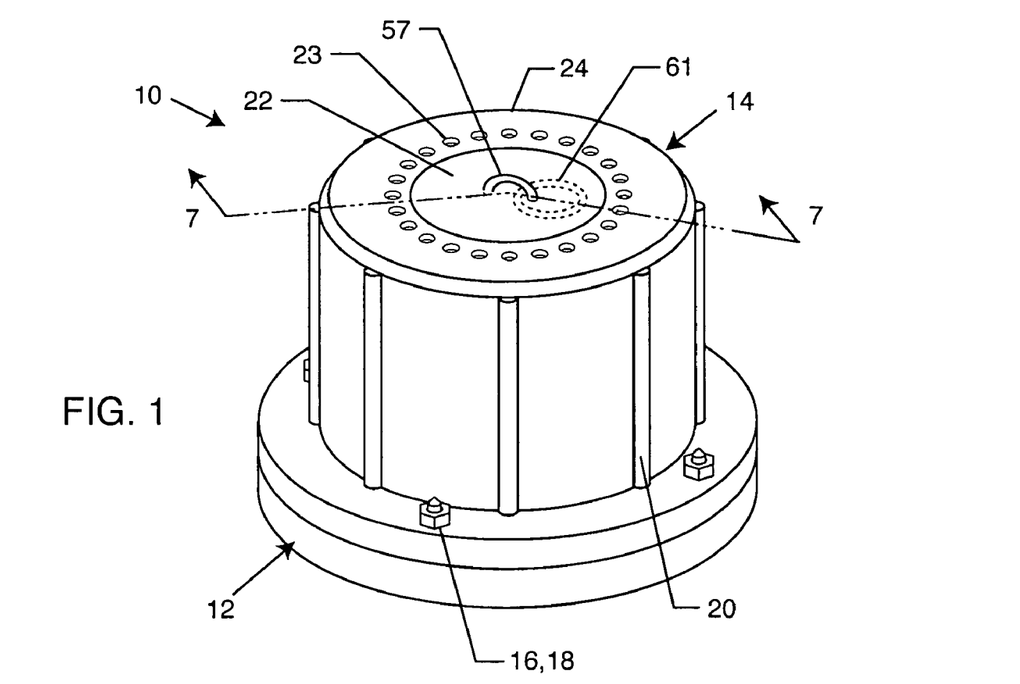
FIG. 1 is a top perspective view of a vacuum relief safety valve embodying the present invention.
Figure 2:
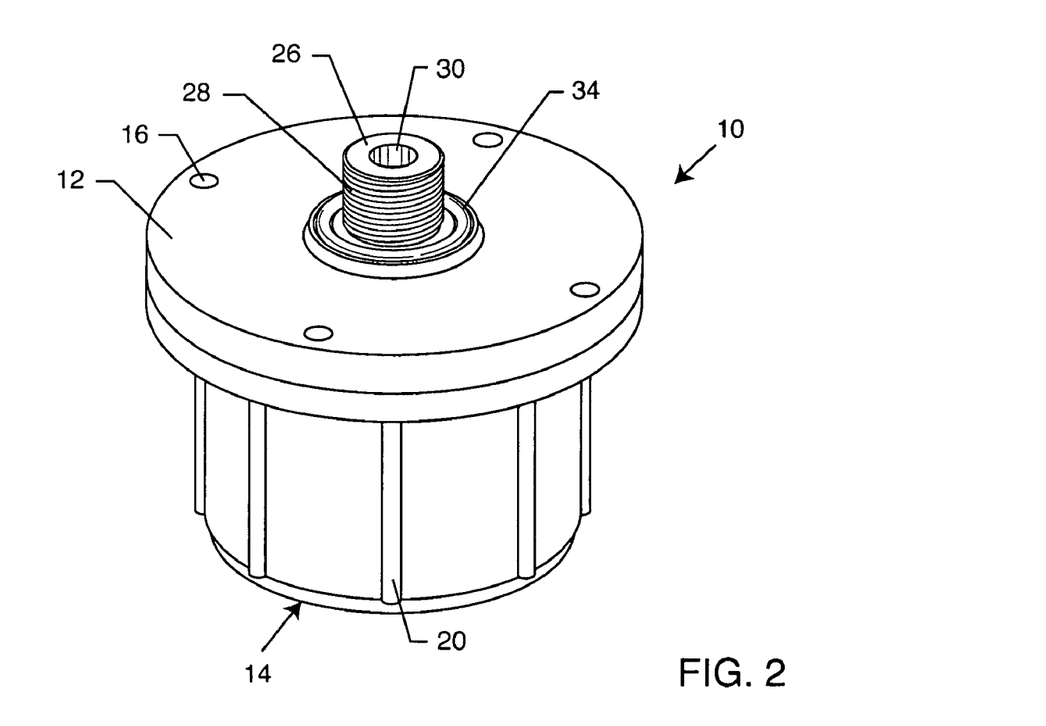
FIG. 2 is a bottom perspective view of the safety valve of FIG. 1.
Figure 3:
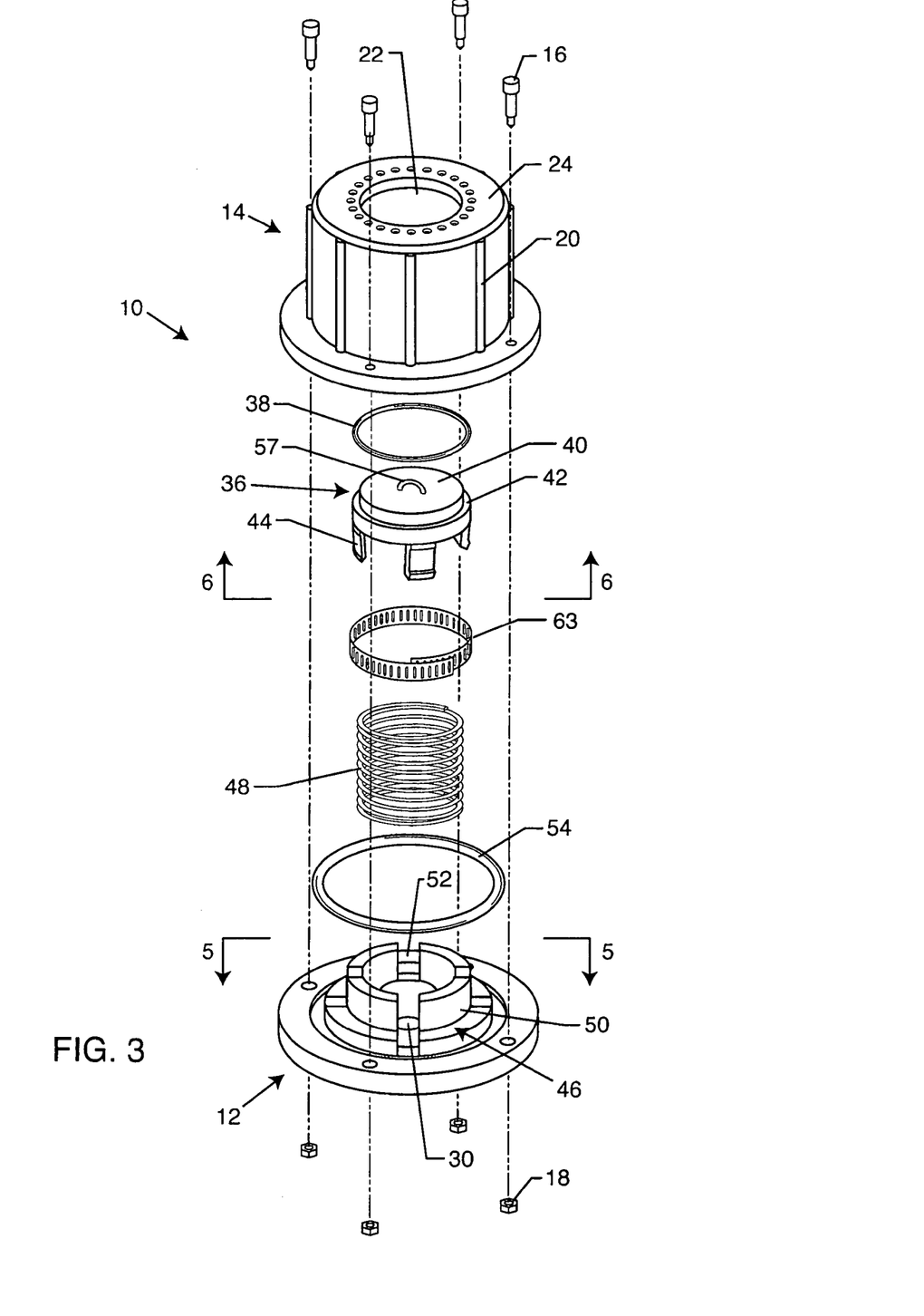
FIG. 3 is a top exploded perspective view of the safety device of FIG. 1, illustrating the various component parts thereof.
Figure 4:
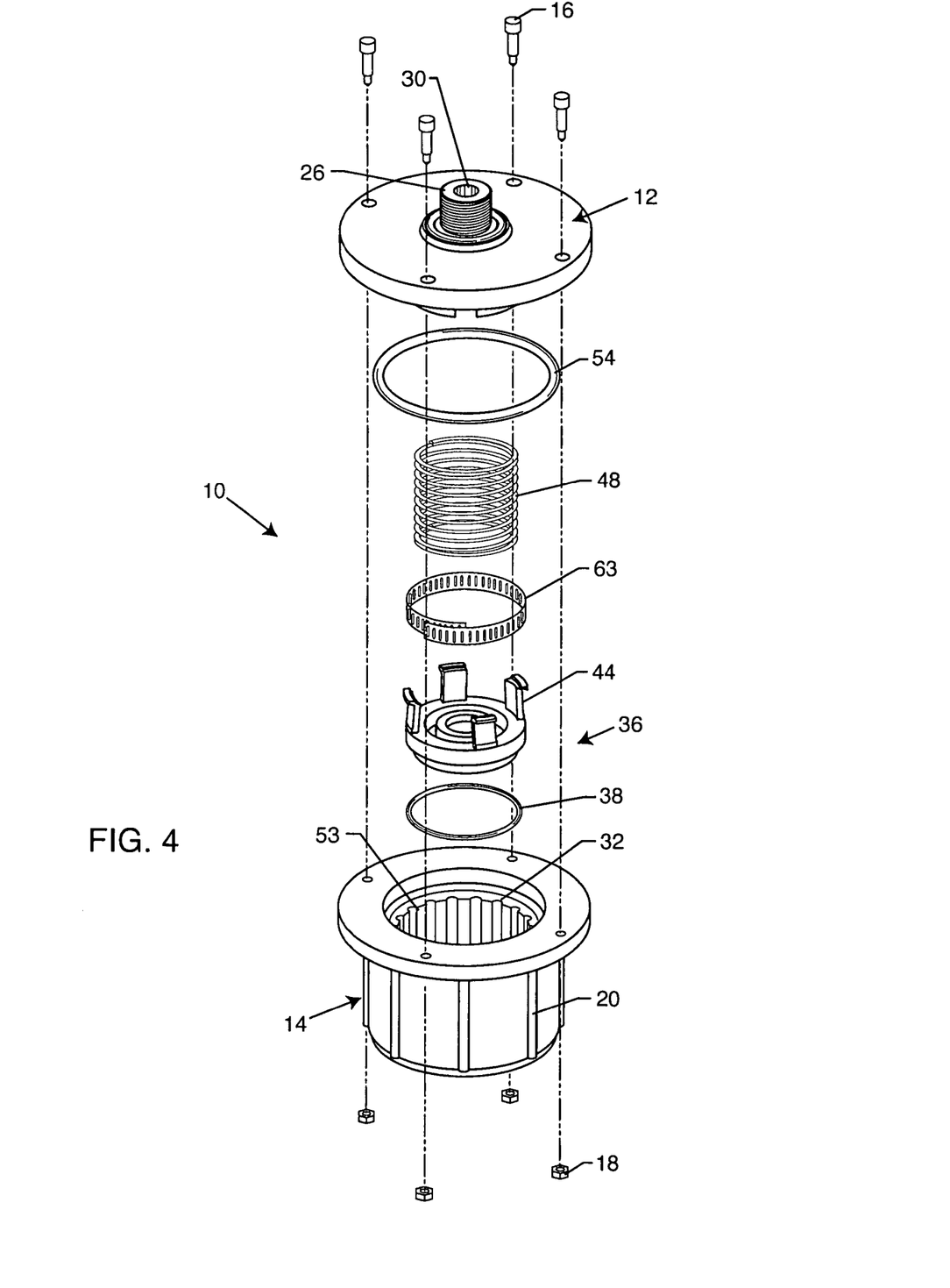
FIG. 4 is an exploded perspective view of the safety valve of FIG. 2.
Figure 7:
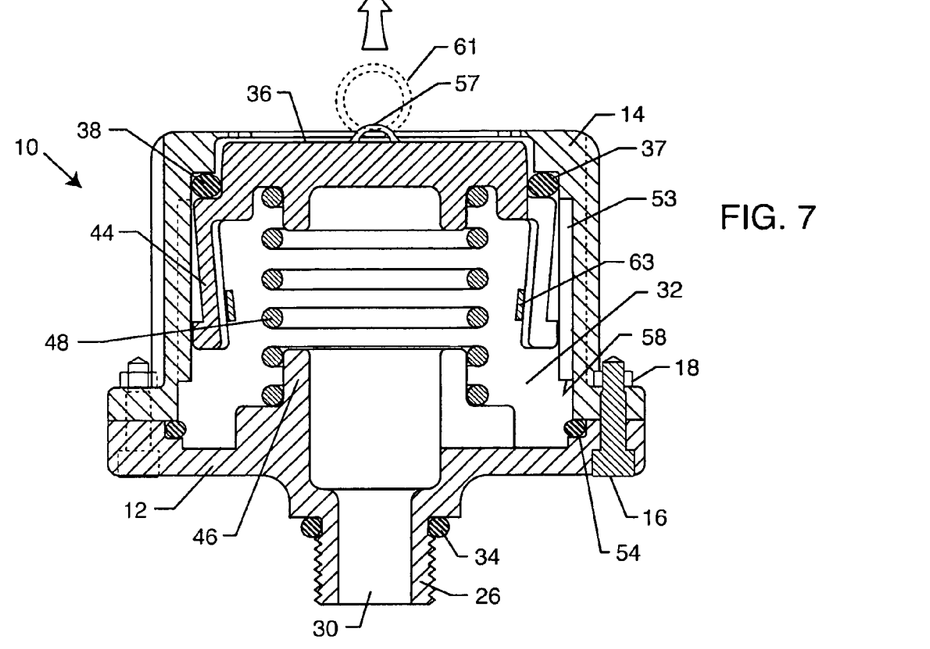
FIG. 7 is a cross-sectional view taken generally along lines 7-7 of FIG. 1, illustrating the safety valve in a closed position.
Figure 8:
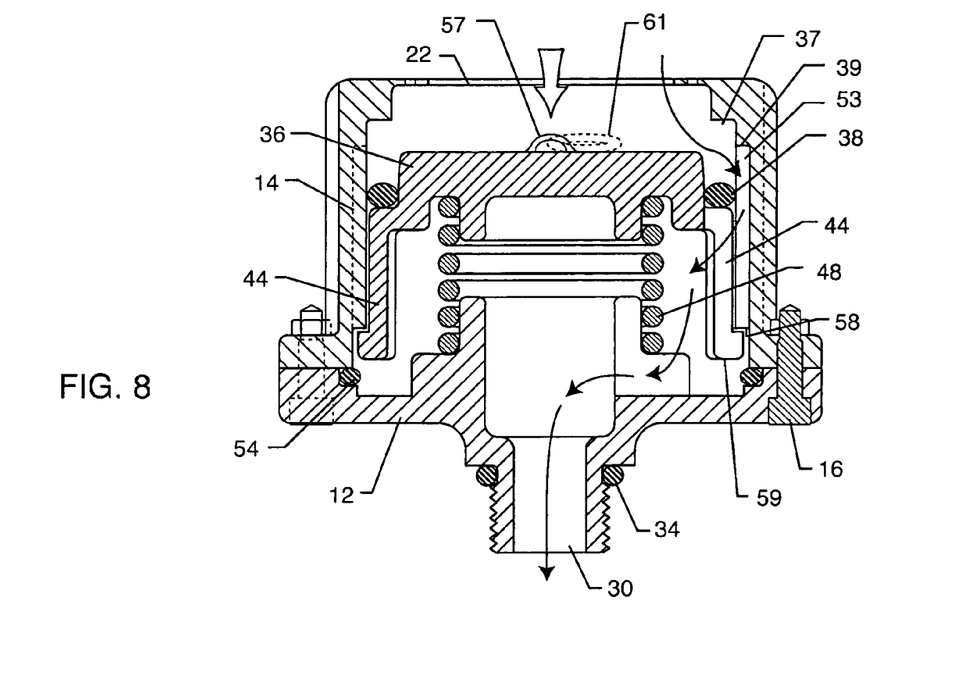
FIG. 8 is a cross-sectional view similar to FIG. 7, but illustrating the safety valve in an open position, permitting air to flow therethrough and into a pump of the swimming pool system.

With reference now to FIGS. 3-6, a sealing element 36 is disposed within the housing and biased upwardly against the upper end wall 24 of the cap 14 so as to seal the air inlet aperture 22. A gasket, such as the illustrated rubber O-ring 38, is disposed between the housing and the sealing element 36 so as to create an air and fluid-tight seal. Preferably, the housing includes a ledge 37, as illustrated in FIGS. 7 and 8, which the O-ring or gasket 38 engages when in the closed position so as to seal the housing 10 in an orthogonal seal. This O-ring or an added O-ring will engage radially to form a seal between sealing element 36 and the inside of the housing at ledge 39A to form a piston like mechanism that creates pneumatic compensation for any existing pool set-up. Also, this dual sealing will work as a back-up airtight seal. In a particularly preferred embodiment, the sealing element 36 is of a disc-figuration, as illustrated in FIGS. 3 and 4, so as to include an upper plate portion 40 sized to extend into the air inlet aperture 22, and having a beveled skirt 42 which forms a conic sealing surface for better air tight sealing when it engages the O-ring 38. Arms 44 extend outwardly from the sealing element 36 so as to flex against an inner wall of the housing, as will be more fully described herein.

The base plate 12 includes a seat 46 which supports a spring 48 thereon. The spring is a compression spring so as to extend outwardly away from the base plate 12 and contact the sealing element 36 so as to bias it into engagement with the upper wall 24 of the cap 14 so as to seal the air inlet aperture 22. The seat 46 preferably includes a cylindrical guide 50 which extends into the spring 48 and properly positions the spring 48. The seat 46 preferably includes one or more channels 52, as will be more fully described herein. Typically, a gasket, such as a rubber O-ring 54, is used to seal the base plate 12 and cap 14 such that the housing is air and fluid tight.

Figure 5:
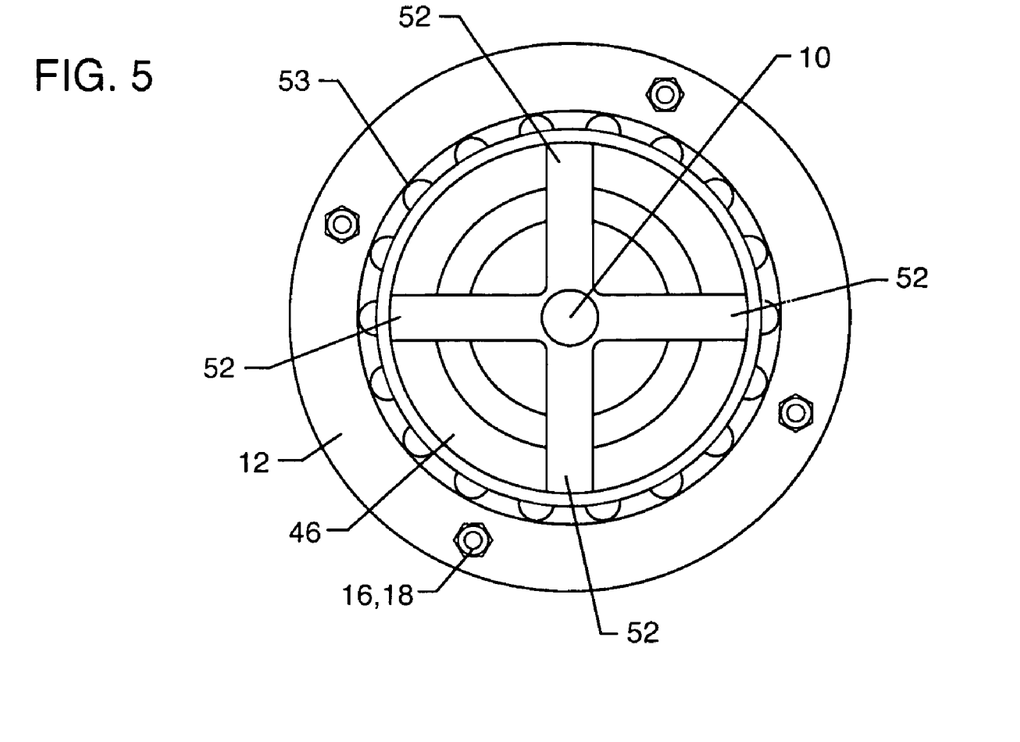
FIG. 5 is a cross-sectional valve taken generally along line 5-5 of FIG. 3.

With reference now to FIG. 5, it is seen how the channels 52 extend through the seat 46 and towards the aperture 30 of the base plate 12. As will be more fully described herein, this allows air to flow from the housing into the pump, even when the spring 48 is completely compressed. The inner wall of the housing also includes at least one depression 53, typically in the form of elongated flutes, which permit air to pass through the housing around the sealing element 36 when the sealing element 36 is moved into the inner chamber, as illustrated in FIG. 8.

Figure 6:
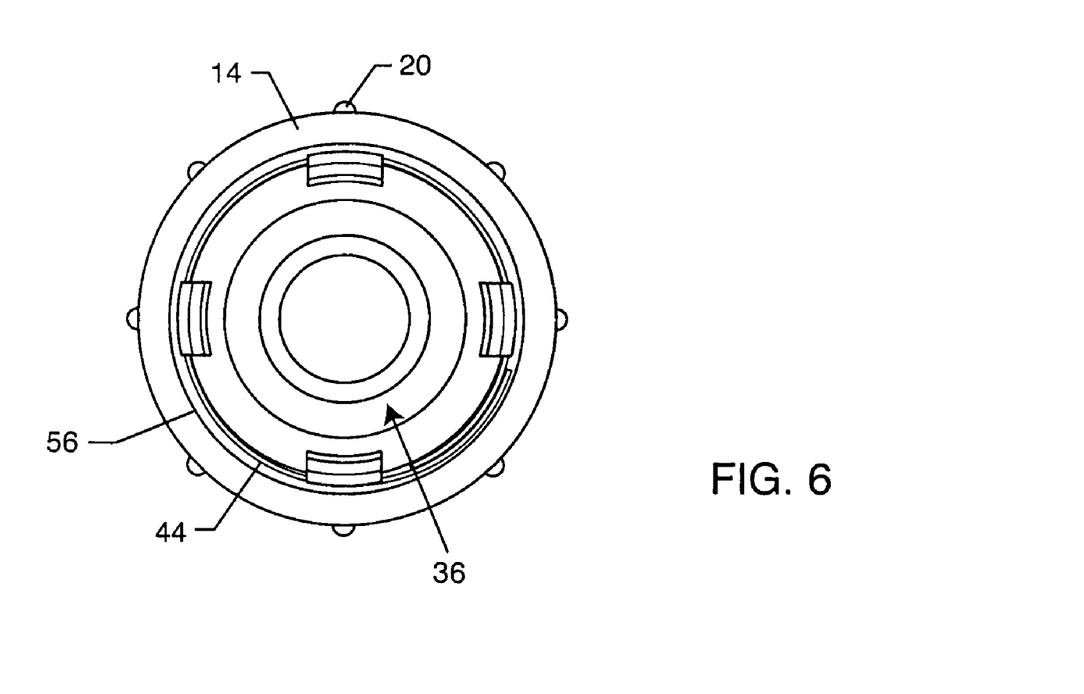
FIG. 6 is a cross-sectional view taken generally along lines 6-6 of FIG. 3.

With reference now to FIG. 6, the sealing element 36 is shown with end extensions of the arms 44 in engagement with the surface of the inner wall 54 of the cap 14 of the housing. As will be more fully described herein, the flexed arms 44 not only serve as a guide for the sealing element 36, but also slow the return of the sealing element 36 once it has been displaced into the housing by an excessive vacuum situation in the pump when a child or object is trapped in a drainage inlet of the swimming pool or spa. An end 59 of the arms 44 includes a projection which is adapted to engage a ledge 58 of the housing such that if the sealing element 36 is withdrawn sufficiently into the housing, the arms push the projection 59 into engagement with the ledge 58 to prevent the sealing element 36 from moving into the closed position again. This satisfied certain pool and spa safety requirements in that the safety valve must be manually reset.

With reference now to FIGS. 7 and 8, the general operation of the safety valve will now be explained. With reference to FIG. 7, the at rest position of the sealing element 36 is biased upwardly or outwardly such that the upper plate portion 40 extends into the air inlet aperture 22 and the beveled skirt 42 engages the O-ring 38 so as to effectively seal the air inlet aperture 22. This is the standard position for normal operating conditions. For example, when the safety valve 10 is connected to the pump, water from the pump enters aperture 30 and fills the inner chamber 32 of the housing. The sealing element 36 is biased outwardly so as to seal the safety valve 10 while the pump is in normal operation, or is off.

However, with reference to FIG. 8, when a drain or inlet of the swimming pool or spa is obstructed, such as if a child were to be held at the drain port, the vacuum within the pump would significantly increase causing the sealing element 36 to be pulled into the inner chamber 32. The spring 48 would be compressed by such action, and air (illustrated by the directional arrows in FIG. 8) would flow into the safety valve 10 through the air inlet aperture 22 which would now be open. The sealing element 36 is designed so that the air can flow around it as shown in FIGS. 6 and 8. The air then flows through aperture 30 and into the pump, causing it to lose its prime. As can be seen in FIG. 8, even when the spring 48 is completely compressed such that the coils rest upon one another, the air is still able to pass into aperture 30 due to the channels 52 formed in the seat 46.

When the pump loses its prime, the child or other object is able to be removed from the drain or inlet. This causes the high vacuum condition within the pump to return to normal, and thus the spring 48 to begin to bias the sealing element 36 upwardly again. In a particularly preferred embodiment, as illustrated, the arms 44 flex outwardly and into engagement with the inner surface of the cap 14 of the housing to slow the motion of the sealing element 36. A ledge or shoulder 58 can be formed on the inner wall of the cap 14 of the housing such that a protrusion 59 of the arm 44 engages with the shoulder 58. This stops the sealing element 36 from moving upwardly. Thus, the child or object near the drain is able to be completely moved away from the drain. Otherwise, if the sealing element 36 were to immediately return to its closed position, the object or child may be sufficiently close to the drain in so as to be sucked against it again. The valve 10 includes a manual means for repositioning the sealing element 36 into the closed position. In a preferred embodiment, a latch or knob 57 is attached to or integrally formed with the sealing element 36. This enables a key ring or the like 61 to be attached thereto. Thus, when the sealing element 36 is in its open and locked position, the pool owner merely need grasp the ring 61 and pull the sealing element 36 out of engagement with the ledge 58 and back into its closed position. It will be appreciated that once sufficient force is applied, the flexible arms 44 will move inwardly, and the arm projection 59 moves out of engagement with ledge 58. At this point, spring 48 will push the sealing element 36 back into its closed position.

The size and characteristics of the spring 48 are dictated by the pool pump. The larger and more powerful the pump, the larger and more powerful the spring 48. This is determined on a pump by pump basis when the safety valve 10 is manufactured. Accordingly, there is no experimentation or adjustment of the safety valve 10 like the prior art. Similarly, there are no adjustment knobs that can be inadvertently adjusted causing the pump to lose its prime when it is not necessary, or even worse resulting in the safety valve not performing when it should, as is the possibility with the prior art.

Instead, the homeowner or service personnel need merely to specify the pump for which the safety valve is to be installed such that the safety valve include the necessary spring that matches the specific pump vacuum level.

The sealing elements 36 and arms 44 can be comprised of a resilient material, such as nylon, causing the arms 44 to be biased outwardly against the housing inner wall. However, it has been found that if the valve is open and closed several times, such as a dozen times or more, the projections 59 at the end of the arms 44 can be worn down, resulting in failure of the arms 44 to engage the ledge 58 and lock the sealing element 36 into an open position. Other materials, such as Teflon, enable the sealing element 36 to be opened and closed numerous times, such as one hundred times or more. However, it has been found that many of these materials, while more durable, do not have the resilient qualities of the nylon material. Accordingly, in a preferred embodiment, a spring, such as the illustrated flat spring 63, is disposed within the arms 44, causing them to be biased outwardly against the housing wall.

It will be appreciated by those skilled in the art that the present invention provides a safety valve which adjusts itself to any pump size and/or any existing pool piping/filtration system. The design of the seal compensates pneumatically to any pool system variations. As described above, the O-ring gasket 38 engages the upper ledge 37 of the housing. This provides a dual face or radial and orthogonal sealing. The face sealing is responsible for blocking the atmospheric air from entering the pump during normal operation. The radial sealing is responsible for, and permits, the sealing element 36 to move slightly inward before allowing air to enter into the pump or system. This is due to the fact that the O-ring 38 must travel past the ledge 37 before air enters into the housing and into the pump, as illustrated in FIG. 8. Thus, for pumps which have a greater horsepower or rating, the sealing element 36 can actually travel slightly into the housing without the pump losing its prime. This also allows small objects, such as leaves and the like, to be caught in the drains without causing the pump to lose its prime. However, if the drain becomes clogged, such as with a child, the sealing element 36 will be moved into its open and locked position. In the preferred embodiment, the sealing element 36 will remain in this open position until it is manually reset, as described above. Thus, the present invention adjusts itself to any normal or abnormal suction variations present within the pool circulation system.

Figure 9:
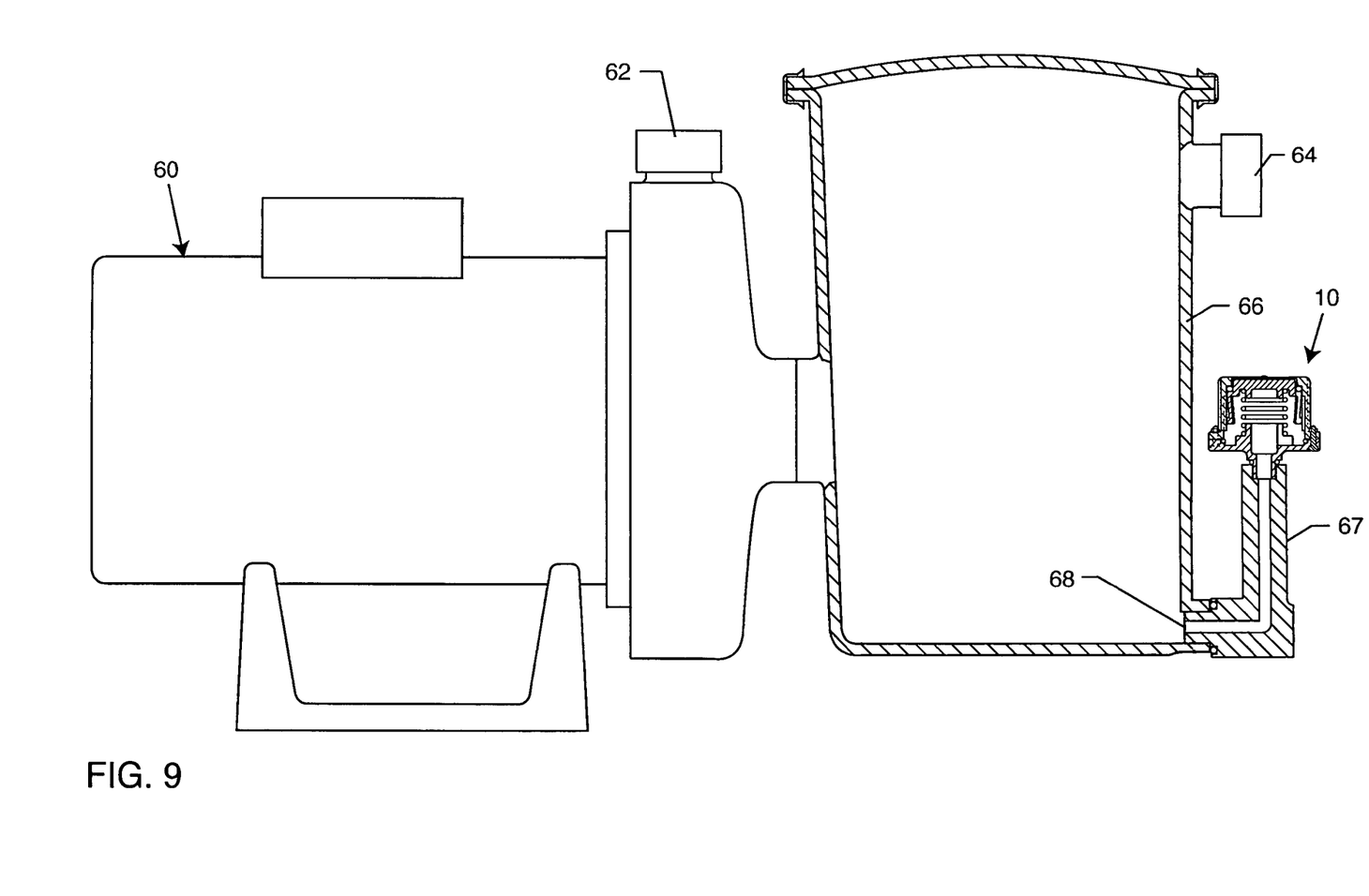
FIG. 9 is a diagrammatic view of a pump having the safety valve of the present invention inserted in a drainage port thereof.

With reference now to FIG. 9, an exemplary diagram of a pump 60 is illustrated. The pump 60 includes a discharge port 62 and a main suction port 64, which in this case is part of a pot 66 attached to the pump 60. In a particularly preferred embodiment, the safety valve 10 of the present invention is threadedly inserted into a threaded aperture 68 which would otherwise hold the drain plug. This has many advantages. First, the safety valve 10 of the present invention is directly attached to the pump 60 itself, lessening the reaction time between the pump high vacuum condition, and the response by the safety valve 10 to cause the pump 60 to lose its prime. Another advantage is that the size of the aperture 68 can be another indicator to specify the pump and safety valve 10. Pumps typically have different diameter drain plug outlets 68. Thus, the threaded extension 26 of the safety valve 10 of the present invention can match the particular pump and will not fit another pump. It will be noted that the safety valve device 10 is connected to an elbow fitting 67, which disposes the safety valve 10 above the bottom portion of the pump 60. The principle behind this arrangement is that when the safety valve 10 is locked in its open position, as described above, the positioning of the valve 10 will prevent all of the water within the pump 60 from draining therefrom. This could occur, for example, during the night if a sack or other debris were to clog the drain of a swimming pool, causing the safety valve device 10 to open. Before being manually retracted, all of the water from the pump 60 could drain, causing damage to the pump and system. Instead, the positioning of the safety valve 10 above a lower portion of the pump 60 prevents this.

Another advantage is that the safety valve of the present invention now serves a dual purpose. In addition to performing the safety function described above, the safety valve 10 also serves as a discharge (drainage) port for winterizing and the like. Typically, a drain plug is threadedly received in the drain port 68. When the pump is not going to be used for prolonged periods of time, or when cold weather is eminent, the drain plug is removed such that the water within the pump drains therefrom. In this case, the pool owner can use his or her finger to push against the sealing element 36 so that it is pushed into the housing, causing the water within the pump to flow out of the pump, through the housing and be discharged. In the event that the elbow fitting 67 is utilized to position the safety device 10 in an elevated position, the safety valve device 10, as well as the elbow connection 67 could be unthreaded and removed from the discharge port 68 in order to drain the pump 60 for winterizing purposes. Although the threaded extension 26 is illustrated as being generally centered with respect to the base plate 12, it will be appreciated that the extension 12 can be offset to achieve the same purposes.

Figure 10:
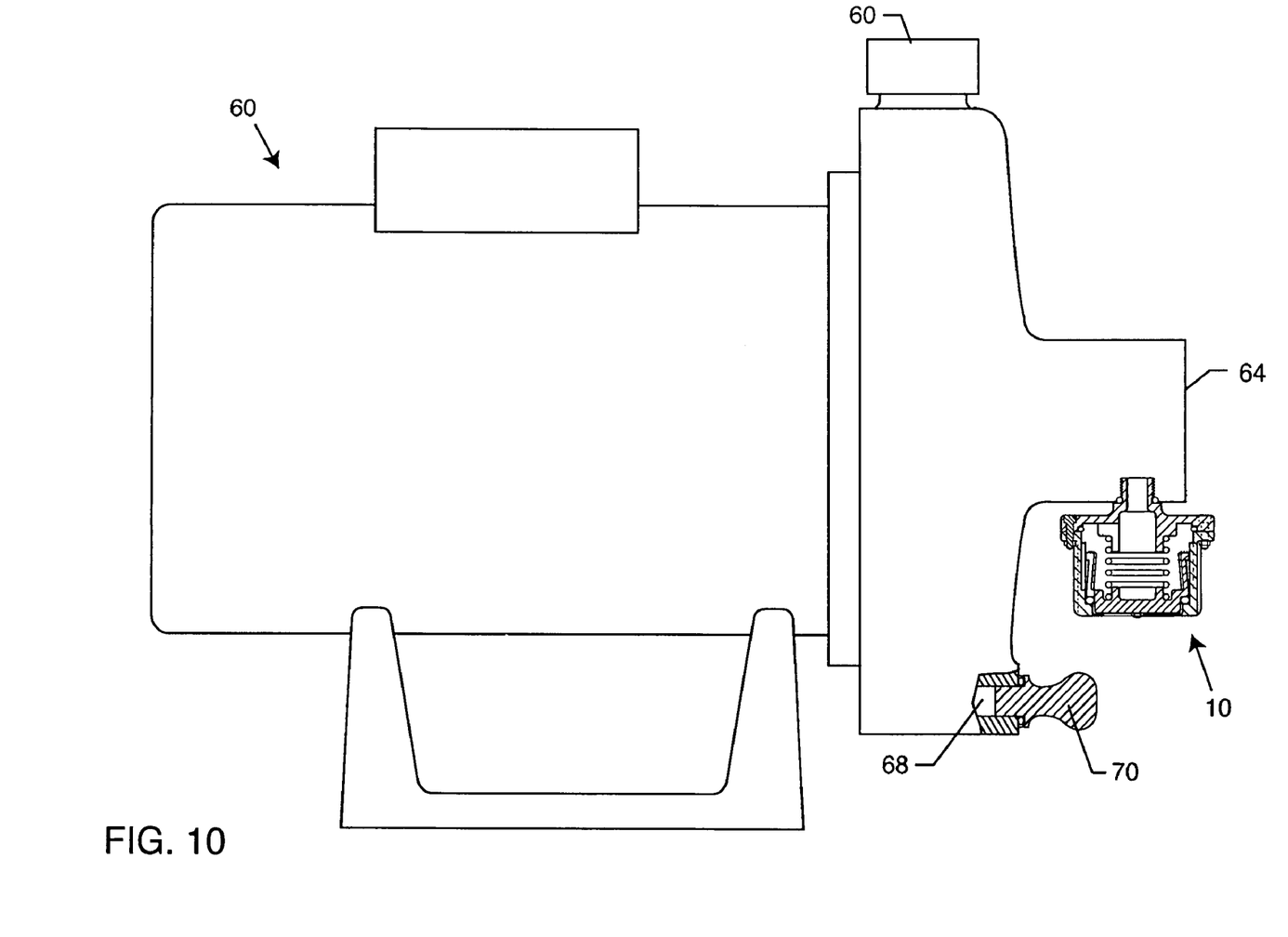
FIG. 10 is a diagrammatic view similar to FIG. 9, but illustrating the safety valve of the present invention attached to another portion of the pump.
Figure 11:
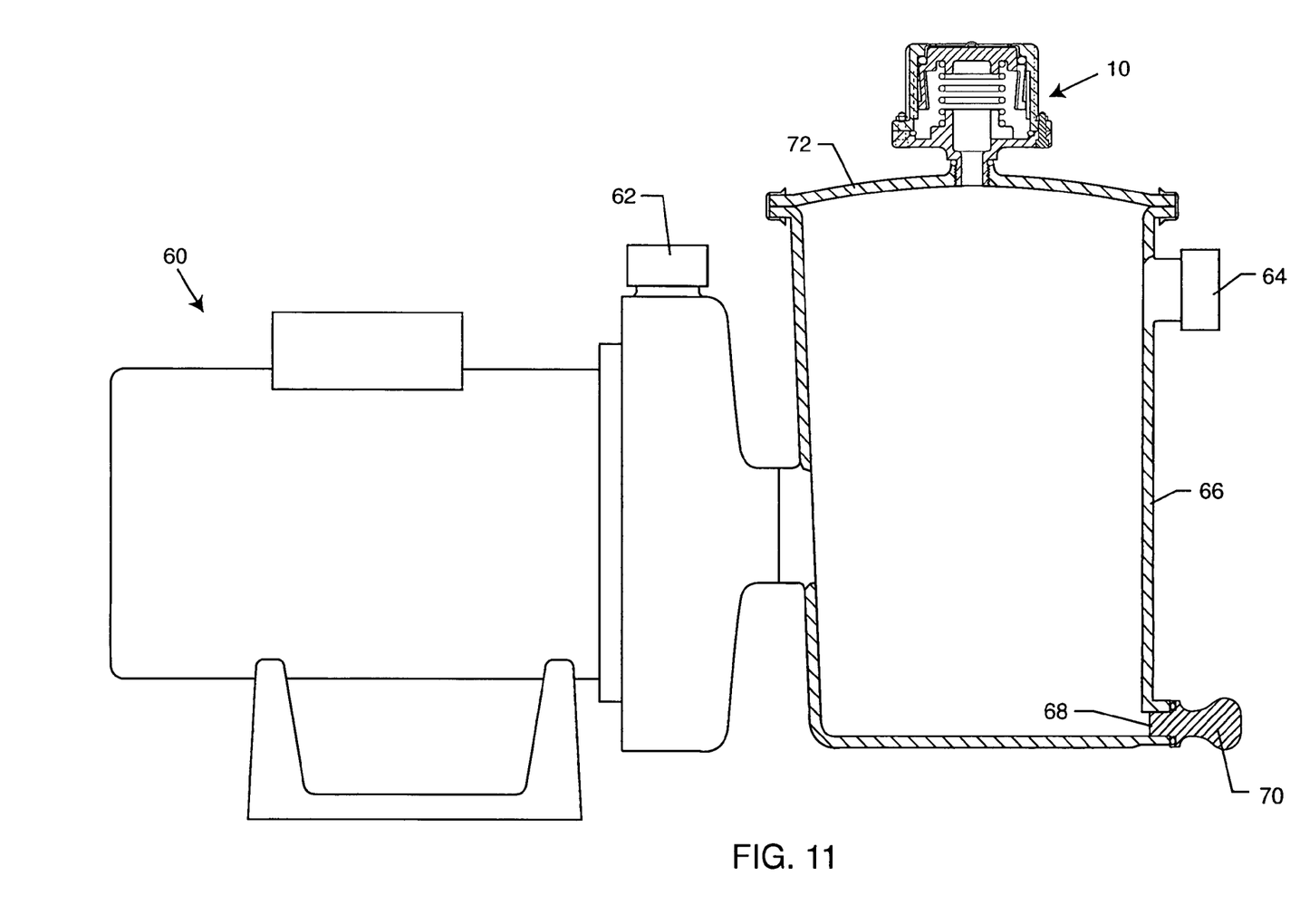
FIG. 11 is a diagrammatic view of a pump having the safety valve of the present invention operably attached thereto.

With reference now to FIGS. 10 and 11, the safety valve 10 of the present invention can also be attached to the pump 60 by other means. A hole can be drilled into the inlet port 64, as illustrated in FIG. 9, or in the pot, such as the lid 72 of the pot 66, as illustrated in FIG. 11. The safety valve 10 of the present invention can be attached thereto, such as by threaded engagement with the internally threaded hole. In such a case, the drain plug 70 would be inserted into the drain aperture 68 in normal fashion. It will be appreciated that the pump manufactures could create the pump 60 or pot 66 so as to incorporate the safety valve 10 of the present invention as original manufacturing (OEM) during the manufacturing of the pump 60 itself.

Although it is preferred to have the safety valve 10 of the present invention directly attached to the pump 60 itself, and most desirably to the drain aperture 68 such that the pool owner can install the safety valve 10 by himself or herself, it is also contemplated that the safety valve 10 could be attached to other parts of the pump and filtration system. That is, for any exposed portions of the piping on the section-side of the pump system. The safety valve 10 of the present invention could be inserted into the pipe. Instead of requiring cuts to the pipe, etc., the piping could merely be drilled and threaded so as to receive the safety valve 10. Alternatively, the safety valve 10 could be sealed using adhesive or the like.

The safety valve 10 described above provides other additional benefits. The valve will typically not need factory repair as it can be easily repaired at the pool site. Practically the only feature that can become compromised over time is the O-rings 34, 38 and 54. The safety valve 10 can be manually removed from the pump or pipe and disassembled so as to replace these O-rings. Such O-rings can be standard off-the-shelf items readily accessible to the homeowner. Preferably, the sealing element 36 is comprised of a material which produces an air tight seal during continuous thermal cycling. A particularly preferred material is frictionless Teflon that precludes the tendency of the sealing element 36 to get stuck with the mating O-ring or gasket 38 even after extended periods of non-use.

Figure 12:
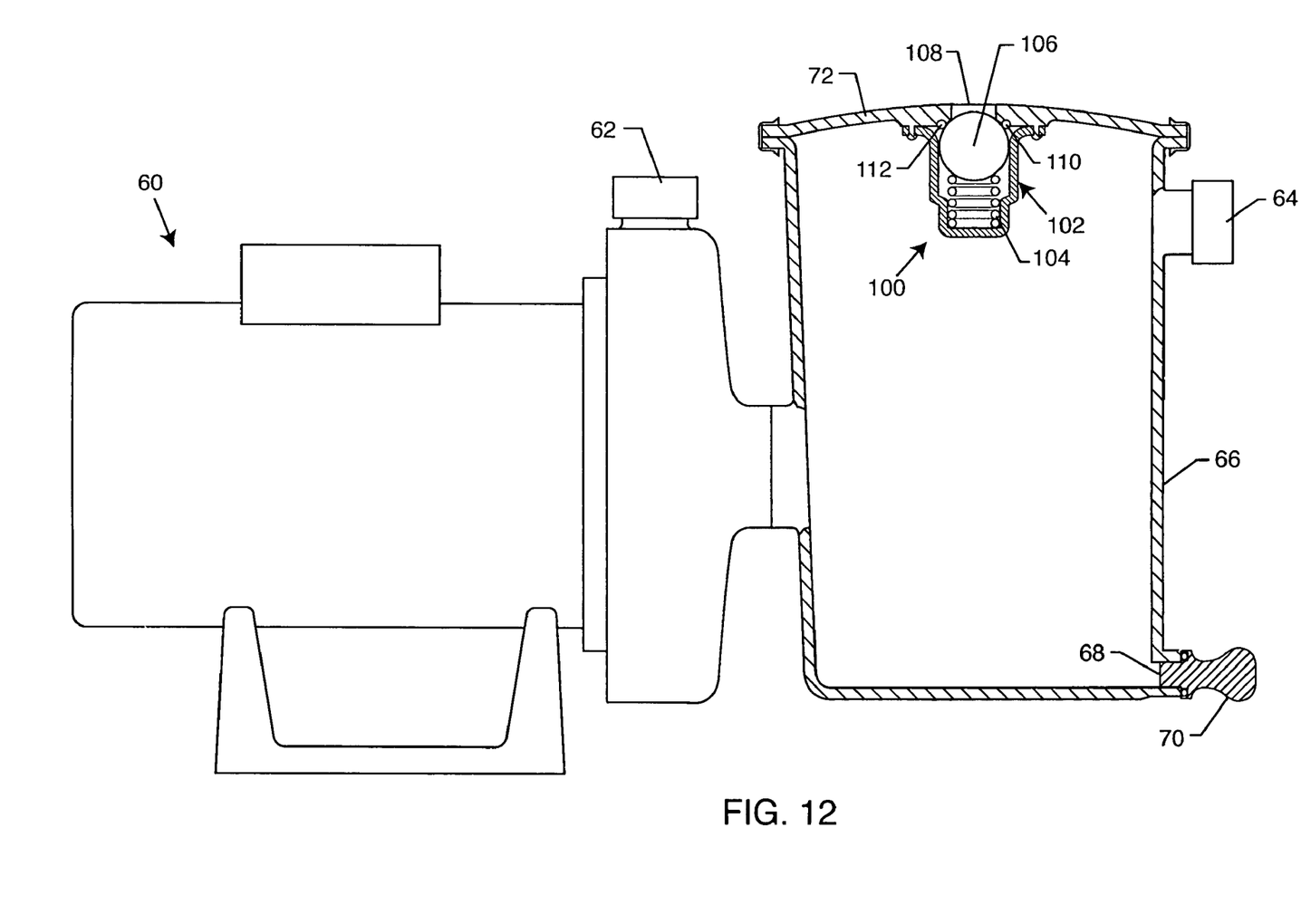
FIG. 12 is a diagrammatic view of a pump incorporating a safety valve embodying the present invention.

With reference now to FIG. 12, another safety valve assembly 100 embodying the present invention is illustrated. This safety valve also includes a housing 102 containing a spring 104 for biasing a sealing member 106 against an air inlet aperture 108. In this case, the sealing element 106 is a ball float which is caged within the housing 102. The ball may be comprised of seamless polyethylene or polyvinyl chloride or any other appropriate material. Although the housing 102 can have a similar structure to that described above, since it is disposed within the pot 66 of the pump 60, it is preferably comprised of an apertured or meshed material. The housing may be bonded or snap-fit, or otherwise connected using connection means 110 to the lid 72 of the pot 66. The air inlet aperture 108 is an aperture formed in the pot's lid 72. A gasket or O-ring 112 forms an air-tight seal with the sealing ball 106 to prevent air from flowing into the pump 60. The operation is similar to that described above wherein when a vacuum level is exceeded, the sealing element 106 is extended into the housing 102 against the bias of the spring 104, causing air to flow through the inlet aperture 108 and into the pump 60 causing it to lose its prime. Of course, it will be appreciated that an arrangement more similar to the safety valve 10 illustrated and discussed above could also be incorporated in the pot 66 to achieve the same purpose.

Figure 13:
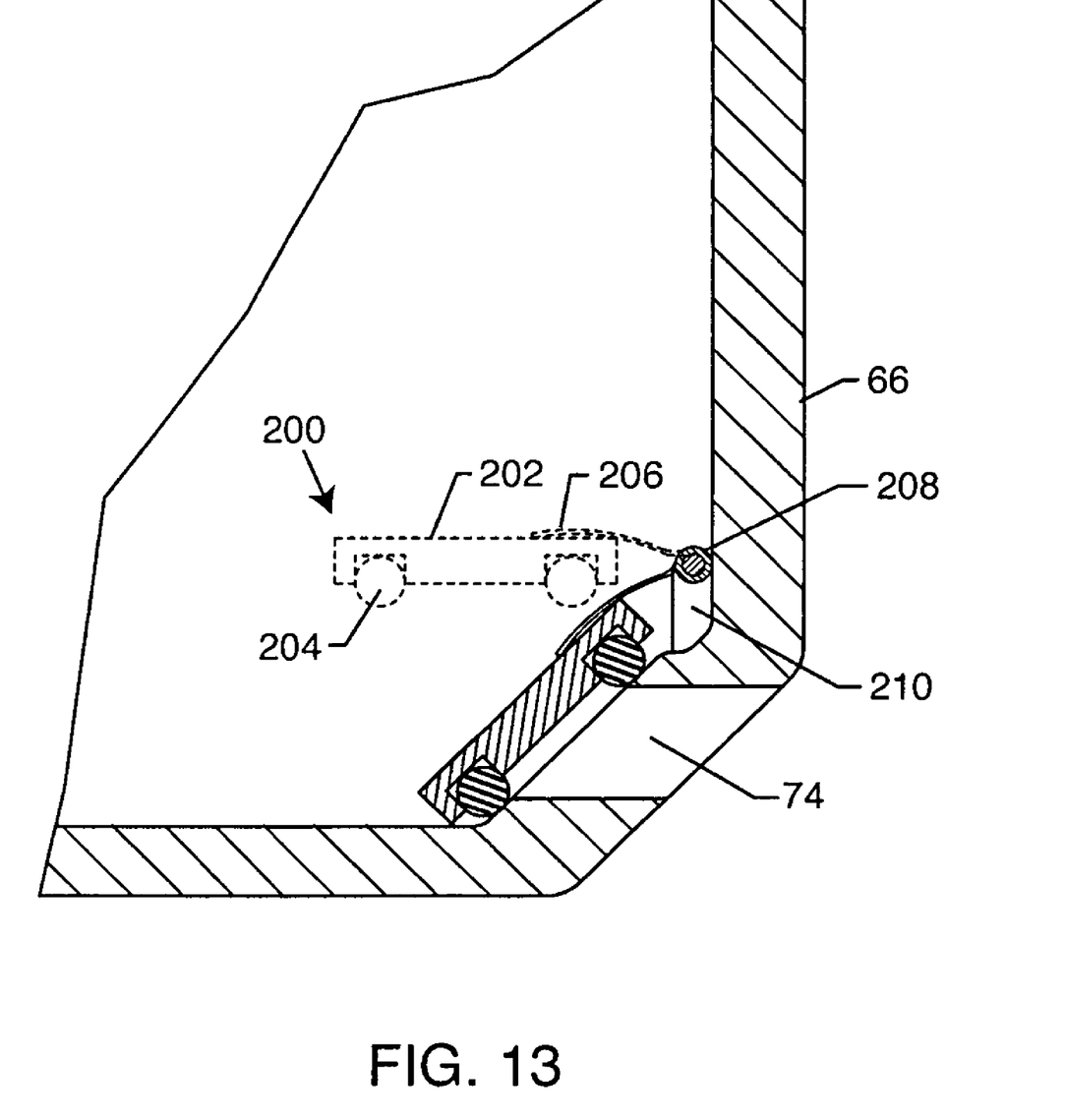
FIG. 13 is an enlarged and fragmented cross-sectional view of a pump having yet another embodiment of the safety valve of the present invention operably attached thereto.

With reference now to FIG. 13, yet another embodiment is illustrated. An aperture 74 is formed in the pot 66, or other structure of the pump 60 or section-side components of the pump filtration system. The safety valve 200 is comprised of a flapper valve 202 having a gasket or rubber O-ring 204. The flapper valve is connected to the pot or other structure with a spring 206 which biases the flapper 202 against the internal sidewall of the pot 66 such that the gasket 204 seals the pot 66. For example, the flapper valve 204 can be mounted between two small standing ribs 210. The ribs 210 are connected to the spring 206 and serve as a pivot point. Preferably, the flapper valve 202 is seated at a 45° angle for quick release of airflow during an emergency. Thus, during an emergency, when the vacuum level within the pump is exceeded, the flapper valve 202 will pivot inwardly, causing apertures 74 to be open and allow air to flow into the pump, causing it to lose its prime. Once the obstruction is removed, the flapper valve 202 will gradually close under the influence of the spring 206. The spring may comprise a helical spring associated with a hinge pin 208 or the like.

The safety valve of the present invention provides many advantages over those disclosed in the prior art. The safety valve of the present invention does not require calibration to experimentation to pool site. There are no complex mechanisms to keep the valve open, and the safety valve of the present invention is simple in design and construction, thus rendering it relatively inexpensive and easy to install and use. The safety valve of the present invention works not only with large water recreational installations, but also residential hot tubs, spas and swimming pools. In fact, the present invention is particularly suited for such residential pools and spas. The safety valve of the present invention does not require electrical wiring or hook-ups, cutting of pipes or specialized tools. The valve is relatively small and easily retrofitable on most pump filtration systems of pools, spas and hot tubs.

Although several embodiments have been described in detail for purposes of illustration, various modifications may be made to each without departing from the scope and spirit of the invention. Accordingly, the invention is not to be limited, except as by the appended claims.

What is claimed is:

1. A vacuum relief safety valve for a swimming pool or spa, comprising:
 a housing defining an inner chamber and attached to a pump or suction-side pump of the swimming pool or spa so as to be in fluid communication therewith;
 an air inlet aperture formed in the housing and open to ambient air;
 a sealing element disposed within the housing;
 a spring disposed within the inner chamber for biasing the sealing element against the air inlet aperture so as to effectively seal the inner chamber from ambient air, wherein the sealing element moves into the inner chamber and opens the air inlet aperture when a maximum allowed vacuum level within the pump is exceeded;
 at least one arm extending from the sealing element and biased against an inner wall of the housing;
 a spring disposed within the at least one leg of the sealing element to bias the at least one arm into engagement with the inner wall of the housing; and
 a ledge formed in a lower portion of the housing adapted to engage a protrusion of the at least one arm when the sealing element is moved into the inner chamber.

2. The safety valve of claim 1, wherein the housing is threadedly connected to a drainage port of the pump.

3. The safety valve of claim 1, wherein the sealing element comprises a disc.

4. The safety valve of claim 1, including a seat formed in the housing against which an end of the spring generally opposite the sealing element engages, the seat having a channel formed therein to permit water or air to pass therethrough when the spring is compressed.

5. The safety valve of claim 1, wherein the housing is comprised of a base plate and a cap cooperatively defining the inner chamber, and wherein the base plate includes an outwardly threaded extension and an aperture extending through the extension and base plate and into the inner chamber, and wherein the air inlet aperture is formed in an end wall of the cap generally opposite the base plate.

6. The safety valve of claim 1, wherein the sealing element includes a gasket on an upper edge thereof which contacts an upper ledge of the housing when the sealing element is in a closed position.

7. The safety valve of claim 1, wherein the inner wall of the housing includes at least one elongated depression formed therein and adapted to allow air to pass therethrough.

8. A vacuum relief safety valve for a swimming pool or spa pump, comprising:
 a housing defining an inner chamber and attached to the pump so as to be in fluid communication therewith;
 an air inlet aperture formed in the housing and open to ambient air;
 a sealing element disposed within the housing and biased against the air inlet aperture so as to effectively seal the inner chamber from ambient air, and adapted to move into the inner chamber and open the air inlet aperture if a maximum allowed vacuum level within the pump is exceeded; and
 at least one arm extending from the sealing element and biased against an inner wall of the housing, the at least one arm having a projection at and end thereof adapted to engage a lower ledge of the housing to lock the sealing element in place when moved into the inner chamber when the maximum allowed vacuum level within the pump is exceeded.

9. The safety valve of claim 8, wherein the housing is threadedly connected to a drainage port of the pump.

10. The safety valve of claim 8, including a spring disposed within the inner chamber of the housing for biasing the sealing element against the air inlet aperture.

11. The safety valve of claim 10, including a seat formed in the housing against which an end of the spring generally opposite the sealing element engages, the seat having a channel formed therein to permit water or air to pass therethrough when the spring is compressed.

12. The safety valve of claim 8, wherein the housing is comprised of a base plate and a cap cooperatively defining the inner chamber, and wherein the base plate includes an outwardly threaded extension and an aperture extending through the extension and base plate and into the inner chamber, and wherein the air inlet aperture is formed in an end wall of the cap generally opposite the base plate.

13. The safety valve of claim 8, wherein at least a portion of the inner wall of the housing includes a depression adapted to permit air to flow therethrough and into the pump when the sealing element is moved into the housing.

14. The safety valve of claim 8, wherein the sealing element includes a gasket on an upper edge thereof which contacts an upper ledge of the housing when the sealing element is in a closed position.

15. The safety valve of claim 8, including a spring disposed within the at least one leg of the sealing element to bias the at least one arm into engagement with the inner wall of the housing.

* * * * *